US012377696B2

(12) United States Patent
Aso et al.

(10) Patent No.: US 12,377,696 B2
(45) Date of Patent: Aug. 5, 2025

(54) VEHICLE

(71) Applicant: ISUZU MOTORS LIMITED, Tokyo (JP)

(72) Inventors: Mitsuhiro Aso, Fujisawa (JP); Masaki Asano, Fujisawa (JP); Kenichi Horiguchi, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 0 days.

(21) Appl. No.: 18/692,854

(22) PCT Filed: Sep. 21, 2022

(86) PCT No.: PCT/JP2022/035074
§ 371 (c)(1),
(2) Date: Mar. 18, 2024

(87) PCT Pub. No.: WO2023/048156
PCT Pub. Date: Mar. 30, 2023

(65) Prior Publication Data
US 2024/0424849 A1  Dec. 26, 2024

(30) Foreign Application Priority Data
Sep. 27, 2021  (JP) .................. 2021-156699

(51) Int. Cl.
B60G 11/16  (2006.01)
B60G 3/14  (2006.01)
B60G 11/28  (2006.01)

(52) U.S. Cl.
CPC ............... B60G 11/16 (2013.01); B60G 3/14 (2013.01); B60G 11/28 (2013.01); B60G 2200/132 (2013.01)

(58) Field of Classification Search
CPC .......... B60G 11/16; B60G 3/14; B60G 11/28; B60G 2200/132
See application file for complete search history.

(56) References Cited

U.S. PATENT DOCUMENTS 3,520,548 A  7/1970 McGee
4,768,601 A  9/1988 Okano
(Continued)

FOREIGN PATENT DOCUMENTS

DE  102018217345 A1  3/2020
EP  1985474 A2  10/2008
(Continued)

OTHER PUBLICATIONS

International Search Report of PCT/JP2022/035074 dated Nov. 8, 2022.

Primary Examiner — Faye M Fleming
(74) Attorney, Agent, or Firm — Shih IP Law Group, PLLC

(57) ABSTRACT

A vehicle in which a load chamber is provided on a vehicle body frame includes: a driver motor that is provided for each of a pair of rear wheels, and rotates the rear wheels independently; a pair of suspension mechanisms that support an axle of the rear wheels. The suspension mechanism is connected to the axle of the rear wheels and includes an arm member whose longitudinal direction extends in the front-rear direction of the vehicle, a support shaft that pivotably supports one end of the arm member in the longitudinal direction with respect to the vehicle body frame, and a spring member provided between the other end of the arm member in the longitudinal direction and the vehicle body.

9 Claims, 4 Drawing Sheets

(56) References Cited

U.S. PATENT DOCUMENTS

| | | | |
|---|---|---|---|
| 7,357,402 B2* | 4/2008 | Berghus | B60G 13/18 |
| | | | 280/124.109 |
| 8,851,500 B2 | 10/2014 | Dobbelaar | |
| 11,433,724 B2* | 9/2022 | Bifano | B60K 7/00 |
| 11,718,133 B2* | 8/2023 | Kirsch | B60G 17/021 |
| | | | 280/124.1 |
| 2004/0232646 A1 | 11/2004 | Peters | |
| 2005/0275185 A1 | 12/2005 | Peters | |
| 2006/0290090 A1 | 12/2006 | Leden | |
| 2007/0102210 A1 | 5/2007 | Oshidari | |
| 2014/0145414 A1 | 5/2014 | Dobbelaar | |
| 2020/0282789 A1 | 9/2020 | Hallundbaek | |
| 2022/0048347 A1 | 2/2022 | Cosmo | |
| 2022/0194489 A1 | 6/2022 | Roche et al. | |
| 2023/0331052 A1* | 10/2023 | Swenson | B60G 9/003 |

FOREIGN PATENT DOCUMENTS

| | | |
|---|---|---|
| JP | S60-038804 U | 3/1985 |
| JP | S62-283073 A | 12/1987 |
| JP | S63-207706 A | 8/1988 |
| JP | H11-115507 A | 4/1999 |
| JP | 2002-178734 A | 6/2002 |
| JP | 2007-131160 A | 5/2007 |
| JP | 2008-537523 A | 9/2008 |
| JP | 2014-512298 A | 5/2014 |
| JP | 2019-048504 A | 3/2019 |
| JP | 2020-050160 A | 4/2020 |
| JP | 2021-041896 A | 3/2021 |

* cited by examiner

VEHICLE

CROSS-REFERENCE TO RELATED APPLICATIONS

The present application is a U.S. National Stage entry of PCT Application number PCT/JP2022/035074, filed on Sep. 21, 2022, which claims priority under 35 U.S.C § 119(a) to Japanese Patent Application No. 2021-156699, filed on Sep. 27, 2021, contents of which are incorporated herein by reference in their entirety.

TECHNICAL FIELD

The present invention relates to a vehicle in which a load chamber is provided on a vehicle body frame.

BACKGROUND OF THE INVENTION

In vehicles such as trucks, a vehicle in which a drive wheel is independently rotated with an electric motor has been proposed (see Patent Document 1). This vehicle includes a suspension mechanism for reducing impacts during traveling.

PRIOR ART

Patent Document

[Patent Document 1]: Japanese Unexamined Patent Application Publication No. 2021-41896

BRIEF DESCRIPTION OF THE INVENTION

Problem to be Solved by the Invention

From the perspective of ease of getting on and off a load chamber of a vehicle and similar considerations, there is a need for low flooring (low floor technology) in the load chamber. However, low flooring in the load chamber was difficult to achieve in vehicles with a high gross vehicle weight on which a load chamber is provided on a vehicle body frame, because an axle type suspension is adopted in such vehicles in order to support heavy loads.

The present invention focuses on this point, and its object is to realize low flooring in a load chamber of a vehicle with a high gross vehicle weight.

Means for Solving the Problem

One aspect of the present invention provides a vehicle in which a load chamber is provided on a vehicle body frame, the vehicle including: a drive motor that is provided for each of a pair of rear wheels, and rotates the rear wheels independently; and a pair of suspension mechanisms that support an axle of the rear wheels, wherein each suspension mechanism includes: an arm member that is connected to the axle of the rear wheel, and whose longitudinal direction extends in a front-rear direction of the vehicle, a support shaft that pivotably supports one end of the arm member in the longitudinal direction with respect to the vehicle body frame, and a spring member provided between the other end of the arm member and a vehicle body.

Further, a length of the arm member in the longitudinal direction may be greater than a diameter of the rear wheel, and the spring member may be a coil spring disposed along a vertical direction.

The vehicle body frame may further include a pair of bearings that are provided on the one end of the arm member or on the vehicle body frame, and support the one end and the other end of the support shaft.

Further, the suspension mechanism may further include a damper part that bonds both ends of the spring member to the other end and the vehicle body.

Further, a length of the arm member in the longitudinal direction may be greater than a diameter of the rear wheel, and the spring member may be an air spring disposed along a vertical direction.

Further, the vehicle body frame may include: a pair of side members extending in the front-rear direction of the vehicle, and a cross member extending in a vehicle width direction for connecting the side members, the arm member may be disposed on an outer side of the side member in the vehicle width direction along the front-rear direction, and the one end of the arm member may be supported by a bracket fixed to the cross member. Further, a floor surface of the load chamber may be lower than a center of the rear wheel in the vertical direction and may be positioned between the pair of suspension mechanisms in the vehicle width direction.

Effect of the Invention

According to the present invention, it is possible to realize low flooring in a load chamber of a vehicle with a high gross vehicle weight.

DESCRIPTION OF EMBODIMENTS

<Outline of a Vehicle>

An outline of a vehicle according to an embodiment will be described with reference to FIG. 1.

Figure 1:
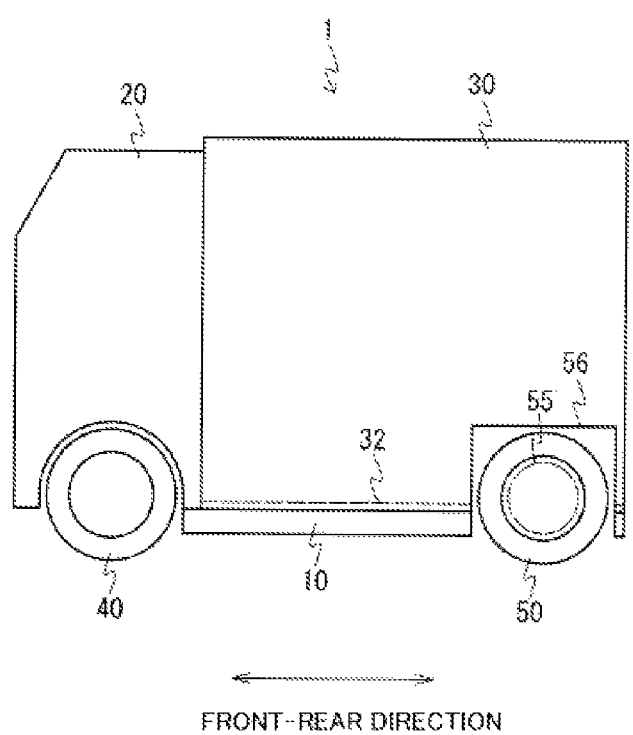
FIG. 1 is a schematic diagram illustrating an external configuration of a vehicle 1.

FIG. 1 is a schematic diagram illustrating an external configuration of a vehicle 1. The vehicle 1 is a truck, for example. The vehicle 1 is an electric vehicle driven by an electric motor. As shown in FIG. 1, the vehicle 1 includes a vehicle body frame 10, a cab 20, a load chamber 30, front wheels 40, rear wheels 50, and a drive motor 55.

The vehicle body frame 10 is a framework that supports the vehicle 1. The vehicle body frame 10 includes (i) a pair of side members extending in a front-rear direction of the vehicle 1 and (i) a cross member extending in a vehicle width direction in order to connect the pair of side frames. The vehicle body frame 10 is positioned lower than the center of the rear wheels 50 in a vertical direction to realize low flooring in the load chamber 30.

The cab 20 is provided on the vehicle body frame 10. Inside the cab 20, a cabin is formed where an occupant such as a driver sits. A communication opening that communicates with the load chamber 30 may be formed on the rear side of the cab 20, and in this case, the driver can move from the cab 20 to the load chamber 30.

The load chamber 30 is provided on the vehicle body frame 10 and is positioned behind the cab 20. The load chamber 30 is formed in a box shape and has a space where goods are accommodated inside the load chamber 30, for example.

The front wheels 40 are front wheels of the vehicle 1, and are a pair of wheels connected to the left side and the right side of a vehicle body. The front wheels 40 are non-drive wheels in the present embodiment, and are steered by the driver operating a steering wheel.

The rear wheels 50 are rear wheels of the vehicle 1, and are a pair of wheels connected to the left side and the right side of the vehicle body. The rear wheels 50 are drive wheels in the present embodiment, and are driven by a drive motor 55. An axle (rotation axle) of the rear wheels 50 is supported by a suspension mechanism which will be described later.

A drive motor 55 is provided for each of the rear wheels 50 in the pair, and each drive motor rotates the corresponding rear wheel 50 independently. The drive motors 55 are respectively provided inside the rear wheel 50 on the left (rear wheel 50L in FIG. 2) and inside the rear wheel 50 on the right (rear wheel 50R in FIG. 2).

In the vehicle 1, the floor surface 32 of the load chamber 30 is lower than an upper surface 56 of a wheel housing of each of the rear wheels 50. In the present embodiment, the floor surface 32 is lower than the center of the rear wheels 50 in the vertical direction in order to realize low flooring in the load chamber 30, from the perspective of ease of getting on and off the load chamber 30 and similar considerations. By doing this, the occupant can get on and off the load chamber 30 in a single step.

It is desirable that a suspension mechanism that supports the axle of the rear wheels 50 be a mechanism that can withstand heavy loads, because the vehicle 1 is a truck with a high gross vehicle weight. As a suspension capable of withstanding heavy loads, an axle type suspension is commonly adopted since it uses leaf springs having minimal trade-off between the spring constant and the stroke amount, but in such a configuration, the axle and the vehicle body frame 10 intersect with each other, and therefore the floor surface 32 of the load chamber 30 cannot be lowered. In contrast, although details will be described later, low flooring in the load chamber 30 capable of withstanding heavy loads is realized in the present embodiment by employing an independent suspension.

<Configuration of a Suspension Mechanism>

As a suspension mechanism according to the present embodiment, a first embodiment and a second embodiment will be described.

First Embodiment

Figure 2:
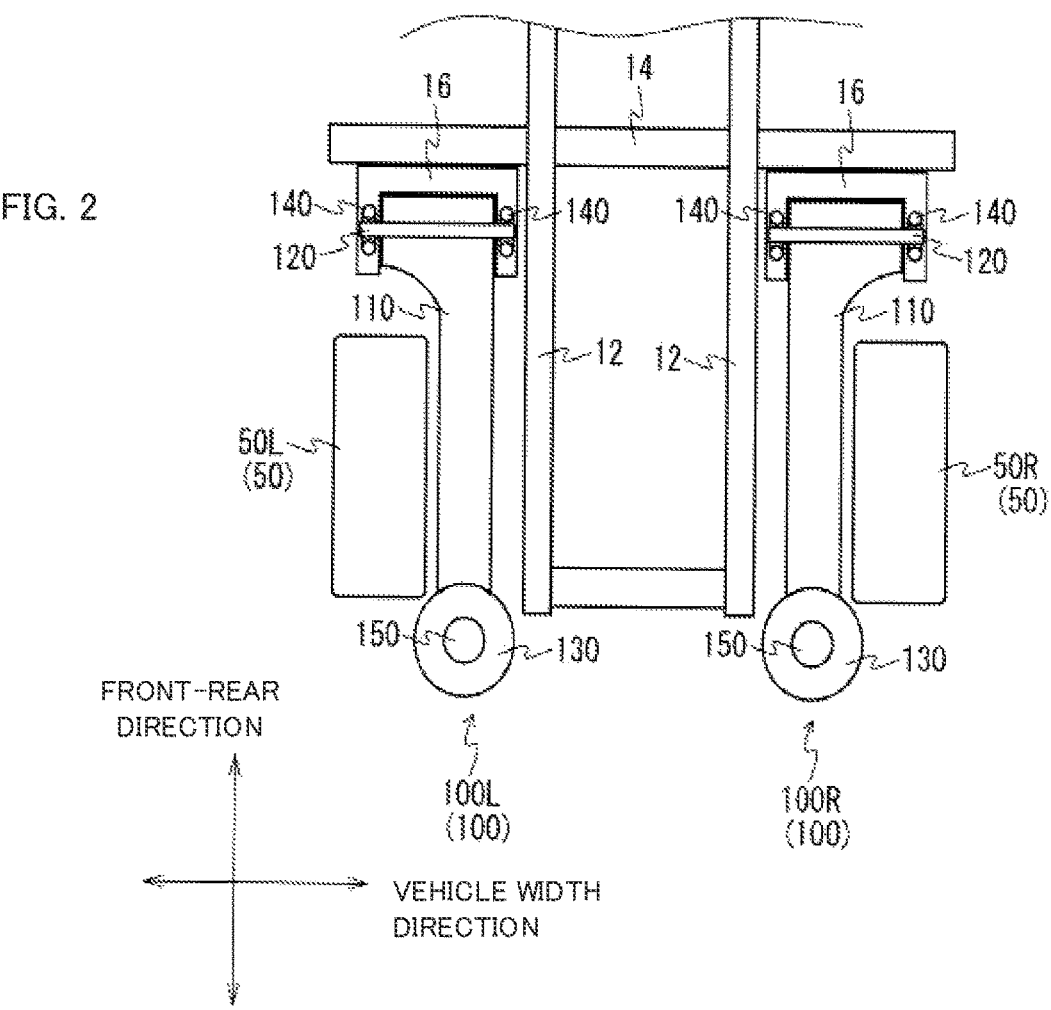
FIG. 2 is a schematic view for explaining a configuration of a suspension mechanism 100 according to a first embodiment.

FIG. 2 is a schematic view for explaining a configuration of a suspension mechanism 100 according to the first embodiment. As shown in FIG. 2, the suspension mechanism 100 includes a pair of suspension mechanisms that are a suspension mechanism 100L for supporting the axle of the left rear wheel 50L and a suspension mechanism 100R for supporting the axle of the right rear wheel 50R. The suspension mechanism 100L and the suspension mechanism 100R are independent suspensions, and are disposed at positions not intersecting the vehicle body frame 10.

The vehicle body frame 10 includes a pair of side members 12 extending in the front-rear direction, a cross member 14 extending in the vehicle width direction, and brackets 16 fixed to the cross member 14. The suspension mechanisms 100L and 100R are positioned on outer sides of the side members 12 in the vehicle width direction, respectively. The floor surface 32 of the load chamber 30 is positioned between the suspension mechanisms 100L and 100R in the vehicle width direction.

Since the suspension mechanism 100L and the suspension mechanism 100R have the same configuration, the suspension mechanism 100L will be described below as an example. As shown in FIG. 2, the suspension mechanism 100L includes an arm member 110, a support shaft 120, a spring member 130, bearings 140, and a damper part 150.

The arm member 110 is connected to an axle (not shown) of the rear wheel 50L, and its longitudinal direction extends in the front-rear direction of the vehicle 1. One end of the arm member 110 is positioned on the front side of the rear wheel 50L, and the other end of the arm member 110 is positioned on the rear side of the axle (not shown) of the rear wheel 50L, in the front-rear direction.

The arm member 110 is disposed on an outer side of the side member 12 in the vehicle width direction, along the front-rear direction. Therefore, the floor surface 32 of the load chamber 30 provided on the vehicle body frame 10 can be lowered because the arm member 110 does not intersect the side member 12 of the vehicle body frame 10.

One end of the arm member 110 is supported by the bracket 16 of the vehicle body frame 10. The bracket 16 has a U shape and surrounds one end of the arm member 110. The bracket 16 is fixed to the cross member 14 of the vehicle body frame 10. Instead of the bracket 16, the arm member 110 may have a U shape.

The support shaft 120 supports one end of the arm member 110 in the longitudinal direction such that said one end is pivotably supported with respect to the vehicle body frame 10. Therefore, the arm member 110 pivots around the support shaft 120 when an impact is applied to the rear wheel 50L.

The spring member 130 is provided between the other end of the arm member 110 in the longitudinal direction and the vehicle body. The spring member 130 is a coil spring in this embodiment. When the spring member 130 is positioned at the other end of the arm member 110, a distance between the support shaft 120 positioned at said one end and the spring member 130 can be increased. In particular, in the present embodiment, since the length of the arm member 110 is greater than the diameter of the rear wheel 50, the spring member 130 can be separated from the support shaft 120 beyond the axle (not shown) of the rear wheel 50L. In this way, because it is possible to add a lever ratio to the spring constant of the coil spring used as the spring member 130 on the axle (not shown) of the rear wheel 50L, the suspension mechanism 100 according to the first embodiment can increase the effective spring constant and withstand heavy loads.

Figure 3:
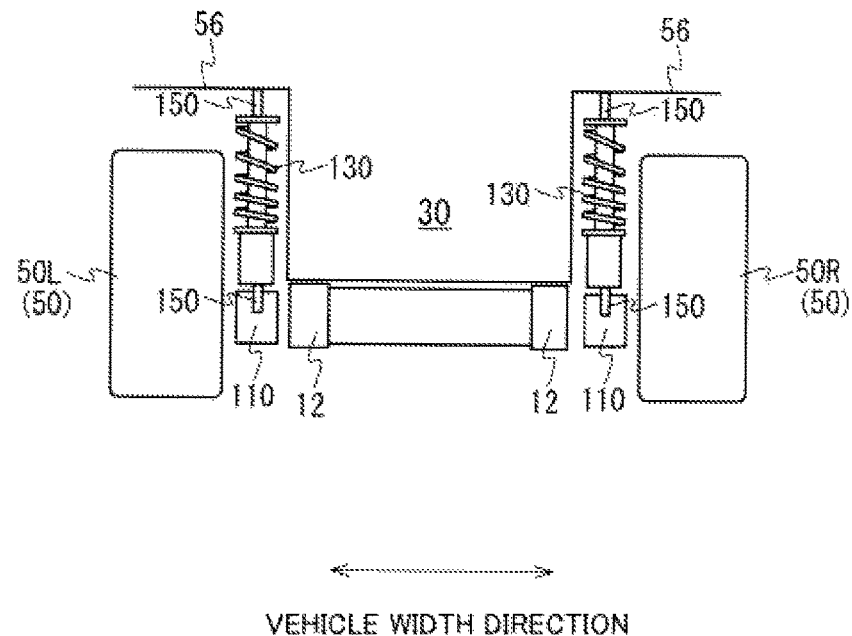
FIG. 3 is a schematic view for illustrating an arrangement of a spring member 130.

FIG. 3 is a schematic view for illustrating an arrangement of the spring member 130. As shown in FIG. 3, the spring member 130 is disposed along the vertical direction. One end of the spring member 130 is positioned on the arm member 110 side, and the other end of the spring member 130 is positioned on the vehicle body (specifically, the upper surface 56 of the wheel housing) side.

As shown in FIG. 2, the bearings 140 are provided on the vehicle body frame 10 (specifically, the bracket 16) and support the support shaft 120. The bearings 140 are disposed on one end side and the other end side in the axial direction of the support shaft 120, and support one end and the other end of the support shaft 120. Although a pair of the bearings 140 is disposed on the bracket 16 in FIG. 2, the present embodiment is not limited thereto, and the pair of the bearings 140 may be provided on the arm member 110.

When the bearings 140 support the support shaft 120, it can resolve an issue that would arise in a case where bushes support the support shaft 120. In the case where the bushes support the support shaft 120, the bushes deflect during turning of the vehicle 1, the rear wheels face outward, and oversteer occurs. In contrast, when the bearings 140 are used, oversteer due to deflection of the bushes can be prevented.

Further, the arm member 110 can pivot more smoothly in the case where the bearings 140 are used in comparison to the case where the bushes are used. In particular, in the case of a configuration where the drive motor 55 is disposed in the rear wheel 50, movement of the arm member 110 is prone to deterioration due to a gyro effect caused by high inertia, but the deterioration of the movement of the arm member 110 can be reduced by employing the bearings 140.

As shown in FIG. 3, the damper part 150 is disposed so as to penetrate through the spring member 130 coaxially. The damper part 150 at one end of the spring member 130 is bonded to the arm member 110, and the damper part 150 at the other end of the spring member 130 is bonded to the vehicle body (for example, the upper surface 56 of the wheel housing). In a case where a bush is employed at one end of the arm member 110, the arm member 110 may sway to and fro due to deflection of the bush, compared to the case of using the bearings 140, but swaying of the arm member 110 can be suppressed by providing the damper part 150 as in the present embodiment.

By employing the above-mentioned suspension mechanism 100 which is the independent suspension, it is possible to arrange a battery, an inverter, or the like under the load chamber 30, while realizing low flooring in the load chamber 30, for example.

Figure 4:
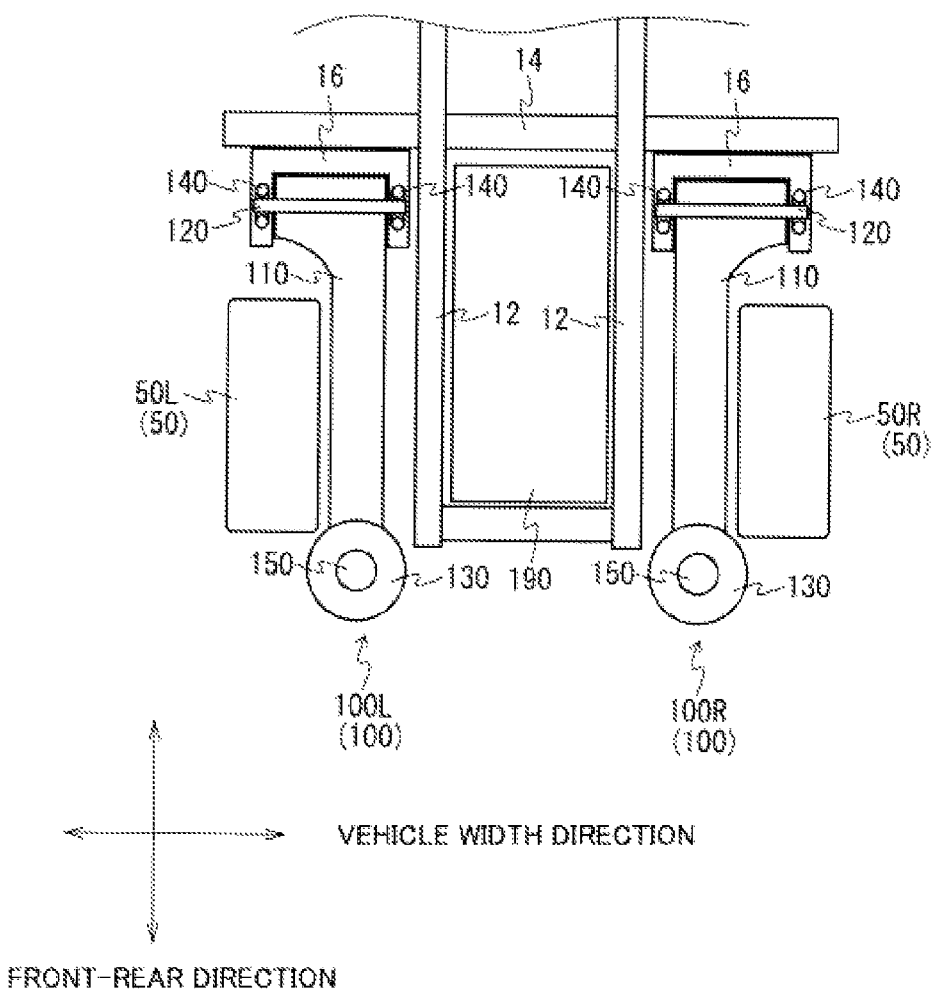
FIG. 4 is a schematic diagram illustrating an arrangement of a battery 190.

FIG. 4 is a schematic diagram illustrating an arrangement of a battery 190. In FIG. 4, the battery 190 is positioned between the suspension mechanism 100L and the suspension mechanism 100R in the vehicle width direction. The battery 190 supplies electric power to the drive motor 55 (FIG. 1). As described above, since there is no member intersecting the side members 12 of the vehicle body frame 10, it is possible to dispose a large battery 190 between the pair of the side members 12. Although the battery 190 is disposed between the pair of the side members 12 in the above description, the present embodiment is not limited thereto, and an inverter may be disposed instead of the battery 190, or an inverter may be disposed together with the battery 190, for example.

Second Embodiment

Figure 5:
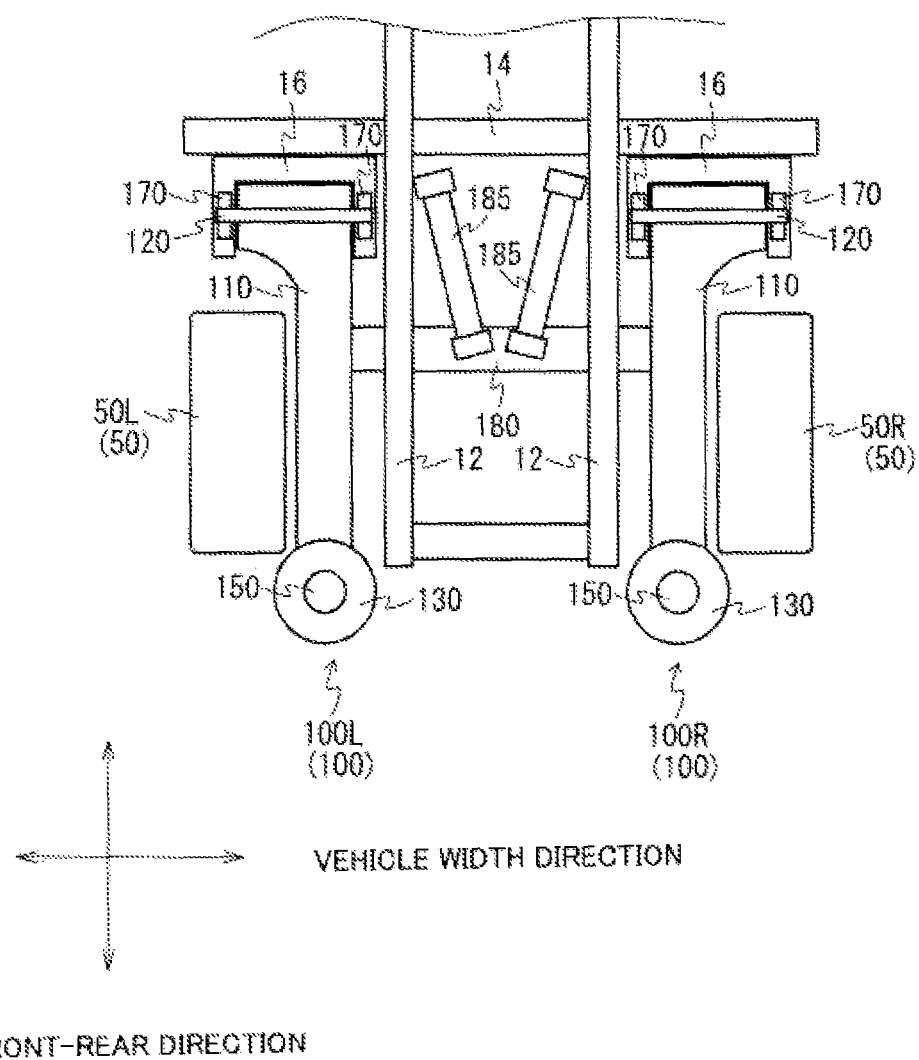
FIG. 5 is a schematic diagram illustrating a configuration of a suspension mechanism 100 according to a second embodiment.

FIG. 5 is a schematic diagram illustrating a configuration of a suspension mechanism 100 according to a second embodiment.

In the first embodiment, the spring member 130 positioned at the other end of the arm member 110 is the coil spring. In contrast, a spring member 130 of the second embodiment is an air spring. Similar to the coil spring described above, the air spring is also disposed along the vertical direction.

In the case where the spring member 130 is the air spring, by adjusting the air supplied to the air spring by a compressor, sagging caused by fully loading goods in the load chamber 30 can be prevented, and consequently it is possible to have a shorter compression stroke as compared to the case of the coil spring of the first embodiment, for example.

In the first embodiment, the bearings 140 support the support shaft 120, but in the second embodiment, bushes 170 support the support shaft 120. Further, in the second embodiment, a beam 180 that connects an arm member 110 of the suspension mechanism 100L and an arm member 110 of the suspension mechanism 100R is provided. Here, the beam 180 makes it possible to have a short compression stroke and is positioned under the side members 12. Further, the beam 180 is supported by the side members 12 via a pair of rods 185. By employing the beam 180 and the rods 185 as described above, oversteer due to deflection of the bushes 170 during turning of the vehicle 1 can be prevented.

In the second embodiment, the bearings 140, instead of the bushes 170, may support the support shaft 120. In this case, the beam 180 and the rods 185 do not need to be used because oversteer due to the deflection of the bushes 170 does not occur.

Effects of the Present Embodiment

The suspension mechanism 100 (100L, 100R) of the embodiment described above is an independent suspension, and includes the arm member 110 extending in the front-rear direction, the support shaft 120 that supports one end of the arm member 110 on the vehicle body frame 10, and the spring member 130 provided between the other end of the arm member 110 and the vehicle body. By doing this, since the arm member 110 does not intersect the side members 12 of the vehicle body frame 10, low flooring in the load chamber 30 can be realized. Further, since the spring member 130 is disposed at a position away from the support shaft 120, the lever ratio can be added to the spring constant of the spring member 130, and therefore the effective spring constant applied to the axle (not shown) of the rear wheel 50 can be increased. As a result, it becomes possible to use the coil spring, which has a trade-off between compatibility of the spring constant and the stroke amount, in the vehicle with the high gross vehicle weight. Therefore, it becomes possible to provide the independent suspension that withstands heavy loads with sufficient stroke, even for trucks that conventionally had to resort to leaf springs to deal with high loads and were unable to adopt independent suspensions.

The present disclosure is explained based on the exemplary embodiments. The technical scope of the present disclosure is not limited to the scope explained in the above embodiments and it is possible to make various changes and modifications within the scope of the disclosure. For example, all or part of the apparatus can be configured with any unit which is functionally or physically dispersed or integrated. Further, new exemplary embodiments generated by arbitrary combinations of them are included in the exemplary embodiments. Further, effects of the new exemplary embodiments brought by the combinations also have the effects of the original exemplary embodiments.

DESCRIPTION OF SYMBOLS

1 Vehicle
10 Body frame
30 Load chamber
50 Rear wheel
55 Drive motor
100 Suspension mechanism
110 Arm member
120 Support shaft 130 Spring member
140 Bearing
150 Damper part

The invention claimed is:

1. A vehicle in which a load chamber is provided on a vehicle body frame, the vehicle comprising:
a drive motor that is provided for each of a pair of rear wheels, and rotates the rear wheels independently; and
a pair of suspension mechanisms that support an axle of the rear wheels;
wherein each suspension mechanism includes:
an arm member that is connected to the axle of the rear wheel, and whose longitudinal direction extends in a front-rear direction of the vehicle,
a support shaft that pivotably supports one end of the arm member in the longitudinal direction with respect to the vehicle body frame, and
a spring member provided between the other end of the arm member and a vehicle body; and
wherein
a length of the arm member in the longitudinal direction is greater than a diameter of the rear wheel, and
the spring member is a coil spring disposed along a vertical direction.

2. The vehicle according to claim 1, wherein the vehicle body frame further includes a pair of bearings that are provided on the one end of the arm member, and support the one end and the other end of the support shaft.

3. The vehicle according to claim 1, wherein the suspension mechanism further includes:
a first damper part that bonds one end side in the axial direction of the spring member to the other end of the arm member, and
a second damper part that bonds the other end side in the axial direction of the spring member to the vehicle body.

4. The vehicle according to claim 1, wherein
a length of the arm member in the longitudinal direction is greater than a diameter of the rear wheel, and
the spring member is an air spring disposed along a vertical direction.

5. The vehicle according to claim 1, wherein
the vehicle body frame includes:
a pair of side members extending in the front-rear direction of the vehicle, and
a cross member extending in a vehicle width direction for connecting the side members,
the arm member is disposed on an outer side of the side member in the vehicle width direction along the front-rear direction, and
the one end of the arm member is supported by a bracket fixed to the cross member.

6. A vehicle in which a load chamber is provided on a vehicle body frame, the vehicle comprising:
a drive motor that is provided for each of a pair of rear wheels, and rotates the rear wheels independently; and
a pair of suspension mechanisms that support an axle of the rear wheels;
wherein each suspension mechanism includes:
an arm member that is connected to the axle of the rear wheel, and whose longitudinal direction extends in a front-rear direction of the vehicle,
a support shaft that pivotably supports one end of the arm member in the longitudinal direction with respect to the vehicle body frame, and
a spring member provided between the other end of the arm member and a vehicle body; and
wherein a floor surface of the load chamber is lower than a center of the rear wheel in the vertical direction and is positioned between the pair of suspension mechanisms in the vehicle width direction.

7. A vehicle in which a load chamber is provided on a vehicle body frame, the vehicle comprising:
a drive motor that is provided for each of a pair of rear wheels, and rotates the rear wheels independently; and
a pair of suspension mechanisms that support an axle of the rear wheels;
wherein each suspension mechanism includes:
an arm member that is connected to the axle of the rear wheel, and whose longitudinal direction extends in a front-rear direction of the vehicle,
a support shaft that pivotably supports one end of the arm member in the longitudinal direction with respect to the vehicle body frame, and
a spring member provided between the other end of the arm member and a vehicle body; and
wherein the vehicle body frame further includes a pair of bearings that are provided on the vehicle body frame, and support the one end and the other end of the support shaft.

8. The vehicle according to claim 5, further comprising:
a battery that supplies electric power to the drive motor, wherein the battery is positioned between the pair of the side members.

9. The vehicle according to claim 5, further comprising:
a pair of bushes that support the one end and the other end of the support shaft;
a connecting member that is provided under the side members along the vehicle width direction and connects the arm members of the pair of the suspension mechanisms to each other; and
a pair of rods that make the pair of the side members support the connecting member.

* * * * *